Patented June 2, 1942

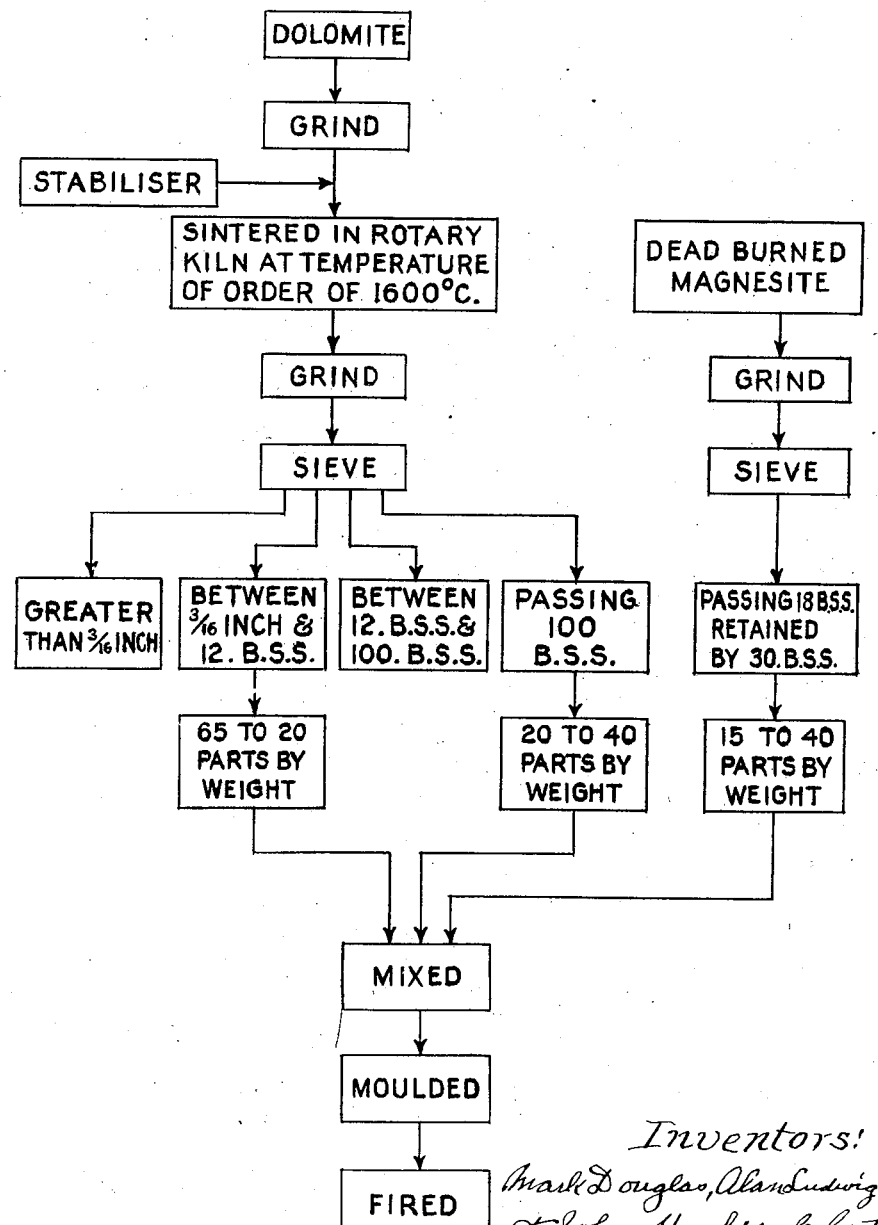

2,285,020

UNITED STATES PATENT OFFICE 2,285,020

MANUFACTURE OF BASIC REFRACTORIES

Mark Douglas and Alan Ludwig Bradley, Worksop, and John Hugh Chesters, Sheffield, England Application June 3, 1940, Serial No. 338,602
In Great Britain June 5, 1939

11 Claims. (Cl. 106—58)

This invention concerns improvements in or relating to the manufacture of basic refractories and has particular reference to the manufacture of dolomite-magnesite bricks.

Bricks and like refractory articles are normally made by moulding a graded mixture of the constituents which frequently includes a proportion of a previously fired, sintered or clinkered mass and subjecting the moulded product to drying and firing.

It is known that the grading and proportioning of the various constituents used in the production of refractory materials, including bricks, are of the highest importance if the products are to possess the requisite properties of resistance to spalling, to attack by slag, and to deformation under pressure when in use.

The production of basic refractories containing dolomite and possessing all the desirable properties above referred to has previously been considered to be extremely difficult if not impracticable.

We have now discovered that dolomite-magnesite bricks, which possess in addition to other desirable properties increased resistance to spalling, may be manufactured by incorporating with the stabilised dolomite clinker, a relatively small percentage of dead burned magnesite which normally contains more than 80% MgO, substantially the whole of the dead burned magnesite being in the form of a fraction of intermediate grain size, and the proportion of dead burned magnesite in the coarse fraction or in the fine fraction being very small.

By the term "dead burnt magnesite" as used in this specification is to be understood magnesia that has been sufficiently hard-fired to reduce the hydration tendency and after-shrinkage to within limits suitable for brick making. Thus, sintered and electrically fused magnesia would also be covered by this term.

The present invention accordingly consists in a process for the manufacture of a moulded dolomite-magnesite refractory which consists in grinding a stabilised dolomite clinker, separating from the ground clinker fractions of coarse and fine grain size, mixing together proportions of the coarse and fine fractions with a proportion of dead burned magnesite of grain size intermediate between those of the coarse and fine fractions of the dolomite.

The invention further includes a process for the manufacture of a dolomite-magnesite refractory, e. g. a refractory brick, in which the clinker content of the mixture is employed only in the form of coarse and fine fractions, and in which the dead burned magnesite content of the mixture is employed only in the form of a fraction intermediate in size in relation to the coarse and fine dolomite fractions.

The proportion of the combined dolomite fractions may be greater than the proportion of the dead burned magnesite and the dead burned magnesite should contain not substantially less than 80% MgO.

The clinkered dolomite material included in the mix is in the form of coarse and fine fractions. The amount of the coarse fraction varies between 65% and 20% and the amount of the fine fraction varies between 20% and 40% on the weight of the whole mix. The dead burned magnesite fraction varies in general between 15% and 40% of the whole mix.

The expressions coarse, intermediate and fine fractions as used in this specification are relative terms only, and are not intended to refer to a fixed range of sizes. In one series of tests, however, the coarse fraction was one which passed through a 3/16 inch sieve, but which was retained by a 12 B. S. S. sieve, the intermediate fraction was one which passed through an 18 B. S. S. sieve but which was retained by a 30 B. S. S. sieve, and the fine fraction was one which passed through a 100 B. S. S. sieve.

It will be understood, however, that these grades are approximate only and will vary with the conditions under which the manufacture is carried out. It will further be understood that the coarse, intermediate and fine fractions may have their limits lying within or outside the extremes mentioned above. Thus, in the case of a particular dolomite-magnesite refractory the intermediate or dead burned magnesite fraction may be such as to pass through a 12 B. S. S. sieve, but to be retained on an 18 B. S. S. sieve.

The invention also includes a dolomite-magnesite refractory the dolomite whereof is present in components of coarse and fine grain sizes and the dead burned magnesite whereof is present in a grain size intermediate between the grain sizes of the dolomite components.

Following is a description by way of example of one method of carrying the invention into effect in the production of a dolomite-magnesite brick.

The figure of the drawing illustrates the steps of one process for carrying out applicants' invention.

*Example*

Dolomite is finely ground and suitably mixed with any of its known stabilising mediums, e. g. magnesium silicates or silica. If the proportions of the above-mentioned materials are such that di-calcium silicate is likely to be formed, then such known stabilisers as borates, phosphorus, and so forth should be added to prevent the beta to gamma inversion of the di-calcium silicate. It is then sintered in a rotary kiln at a temperature of the order of 1600° C., so that the resulting sintered product contains no free lime. The sintered product is ground and graded into coarse and fine fractions of the sizes indicated above, i. e. the coarse fraction passing through a 3/16 inch sieve but being retained by a 12 B. S. S. sieve and the fine fraction passing through a 100 B. S. S. sieve. 55 parts by weight of the coarse fraction are mixed with 25 parts by weight of the fine fraction, and there are added 20 parts by weight of dead burned magnesite in the form of a fraction intermediate in size between the coarse and fine fractions of clinker. The whole is mixed thoroughly and is moulded and fired in the normal way.

We claim:

1. The process of manufacturing a moulded dolomite-magnesite refractory which consists in grinding a stabilised dolomite clinker, separating from the ground clinker a fraction of coarse grain size which passes through a 3/16 inch mesh sieve but is retained on a 12 B. S. S. sieve and a fraction of fine grain size which passes through a 100 B. S. S. sieve, mixing together proportions of the said coarse and fine fractions with a proportion of dead burned magnesite of grain size intermediate between that of the said coarse and fine fractions of dolomite and moulding and firing the mixture.

2. The process of manufacturing a moulded dolomite-magnesite refractory which consists in grinding a stabilised dolomite clinker, separating from the ground clinker a fraction of coarse grain size which passes through a 3/16 inch mesh sieve but is retained on a 12 B. S. S. sieve and a fraction of fine grain size which passes through a 100 B. S. S. sieve, mixing together proportions of the said coarse and fine fractions with a proportion of dead burned magnesite of grain size intermediate between that of the said coarse and fine fractions of dolomite and in amount less than the combined amount of the dolomite fractions and moulding and firing the mixture.

3. The process of manufacturing a moulded dolomite-magnesite refractory which consists in grinding a stabilised dolomite clinker, separating from the ground clinker a fraction of coarse grain size which passes through a 3/16 inch mesh sieve but is retained on a 12 B. S. S. sieve and a fraction of fine grain size which passes through a 100 B. S. S. sieve, mixing together proportions of the said coarse and fine fractions with a proportion of dead burned magnesite of grain size between 12 B. S. S. and 18 B. S. S. and moulding and firing the mixture.

4. The process of manufacturing a moulded dolomite-magnesite refractory which consists in grinding a stabilised dolomite clinker, separating from the ground clinker a fraction of coarse grain size which passes through a 3/16 inch mesh sieve but is retained on a 12 B. S. S. sieve and a fraction of fine grain size which passes through a 100 B. S. S. sieve, mixing together proportions of the said coarse and fine fractions with a proportion of dead burned magnesite of grain size between 18 B. S. S. and 30 B. S. S. and moulding and firing the mixture.

5. The process of manufacturing a moulded dolomite-magnesite refractory which consists in grinding a stabilised dolomite clinker, separating from the ground clinker a fraction of coarse grain size which passes through a 3/16 inch mesh sieve but is retained on a 12 B. S. S. sieve and a fraction of fine grain size which passes through a 100 B. S. S. sieve, mixing 65 to 20 parts by weight of the coarse fraction and 20 to 40 parts by weight of the fine fraction, incorporating in the mixture a proportion of dead burned magnesite of grain size intermediate between that of the said coarse and fine fractions of dolomite and in amount less than the combined amount of the dolomite fractions and moulding and firing the mixture.

6. The process of manufacturing a moulded dolomite-magnesite refractory which consists in grinding a stabilised dolomite clinker, separating from the ground clinker a fraction of coarse grain size which passes through a 3/16 inch mesh sieve but is retained on a 12 B. S. S. sieve and a fraction of fine grain size which passes through a 100 B. S. S. sieve, mixing 65 to 20 parts by weight of the coarse fraction and 20 to 40 parts by weight of the fine fraction, incorporating in the mixture 15 to 40 parts of dead burned magnesite of grain size between 12 B. S. S. and 18 B. S. S. and moulding and firing the mixture.

7. The process of manufacturing a moulded dolomite-magnesite refractory which consists in grinding a stabilised dolomite, clinker, separating from the ground clinker a fraction of coarse grain size which passes through a 3/16 inch mesh sieve but is retained on a 12 B. S. S. sieve and a fraction of fine grain size which passes though a 100 B. S. S. sieve, mixing 65 to 20 parts by weight of the coarse fraction and 20 to 40 parts by weight of the fine fraction, incorporating in the mixture 15 to 40 parts of dead burned magnesite of grain size between 18 B. S. S. and 30 B. S. S. and moulding and firing the mixture.

8. The process of manufacturing a molded dolomite-magnesite refractory which consists in grinding a stabilized dolomite clinker, separating from the ground clinker fractions of coarse grain size which passes through a 3/16" mesh sieve but is retained on a 12 B. S. S. sieve and a fraction of fine grain size which passes through a 100 mesh B. S. S. sieve, mixing together proportions of the said coarse and fine fractions with a proportion of dead burned magnesite containing not substantially less than 80% MgO and of grain size intermediate between that of the said coarse and fine fractions of dolomite and molding and firing the mixture.

9. The process of manufacturing a molded dolomite-magnesite refractory which consists in grinding a stabilized dolomite clinker, separating from the ground clinker fractions of coarse grain size which passes through a 3/16" mesh sieve but is retained on a 12 B. S. S. sieve and a fraction of fine grain size which passes through a 100 mesh B. S. S. sieve, mixing together proportions of the said coarse and fine fractions with a proportion of dead burned magnesite containing not substantially less than 80% MgO and of grain size preponderantly intermediate between that of the said coarse and fine fractions of dolomite and in an amount less than, the combined amount of the dolomite fractions and molding and firing the mixture.

10. The process of manufacturing a molded dolomite-magnesite refractory which consists in grinding a stabilized dolomite clinker, separating from the ground clinker a fraction of coarse grain size which passes through a $\frac{3}{16}''$ mesh sieve but is retained on a 12 B. S. S. sieve and a fraction of fine grain size which passes through a 100 B. S. S. sieve, mixing 65 to 20 parts by weight of the coarse fraction and 20 to 40 parts by weight of the fine fraction, incorporating in the mixture 15 to 40 parts of dead burned magnesite containing not substantially less than 80% MgO and of grain size between 12 B. S. S. and 18 B. S. S. and molding and firing the mixture.

11. The process of manufacturing a molded dolomite-magnesite refractory which consists in grinding a stabilized dolomite clinker, separating from the ground clinker a fraction of coarse grain size which passes through a $\frac{3}{16}''$ mesh sieve but is retained on a 12 B. S. S. sieve and a fraction of fine grain size which passes through a 100 B. S. S. sieve, mixing 65 to 20 parts by weight of the coarse fraction and 20 to 40 parts by weight of the fine fraction, incorporating in the mixture 15 to 40 parts of dead burned magnesite containing not substantially less than 80% MgO and of grain size between 18 B. S. S. and 30 B. S. S. and molding and firing the mixture.

MARK DOUGLAS.
ALAN LUDWIG BRADLEY.
JOHN HUGH CHESTERS.